Patented Nov. 18, 1930

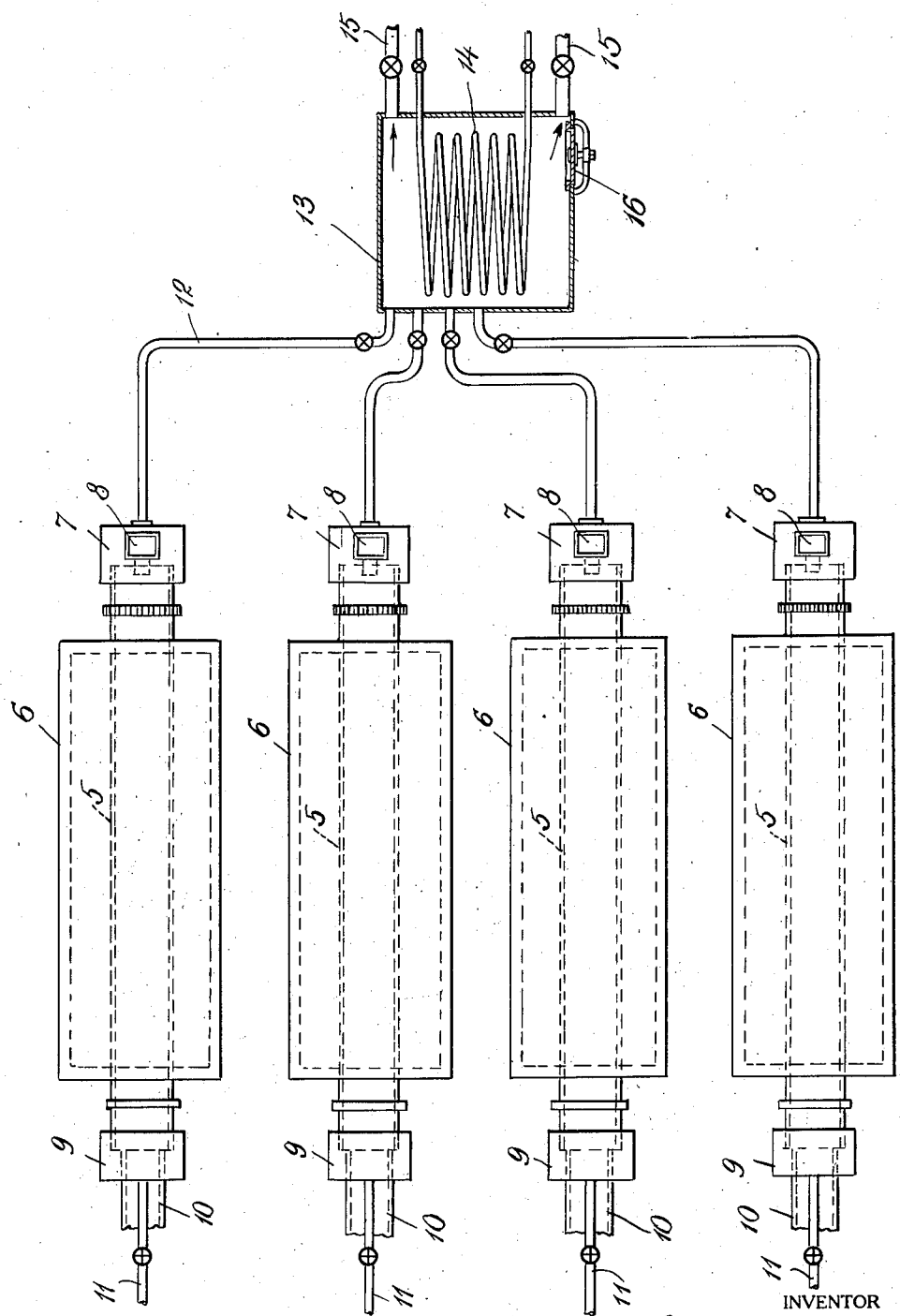

1,782,226

UNITED STATES PATENT OFFICE

RAYMOND F. BACON, OF BRONXVILLE, NEW YORK

RECOVERY OF SULPHUR FROM IRON PYRITES

Application filed April 13, 1927. Serial No. 183,436.

This invention relates to the recovery of sulphur from iron pyrites, and has for its object the provision of an improved method of recovering sulphur in elemental form from iron pyrites.

It is known that if iron pyrites be treated with steam at a high temperature most of the sulphur will be removed from the pyrites. The actual chemical reactions taking place are complicated, but the net results is that the sulphur in the pyrites is largely converted into elemental sulphur while some smaller amount is converted into hydrogen sulfide. So far as I am aware, this process has not been commercially used, probably I believe because the amount of superheated steam that is required to effect substantial removal of the sulphur from the iron pyrites is so large that an uneconomical amount of fuel is necessary in carrying out the process.

In my copending patent application, Ser. No. 181,359, filed April 6, 1927, I have described an improved method of recovering sulphur from iron pyrites by the action of steam characterized by conducting the condensation treatment of the resulting gaseous products under such conditions that no substantial amount of the steam is condensed to water, and then utilizing the exhaust gases of the condensation operation in the further treatment of iron pyrites. In the practice of this process, I have found that a part of the sulphur in iron pyrites is more easily removed by steam at elevated temperatures than is the remainder of the sulphur, and furthermore that more hydrogen sulfide is formed in the removal of the first portions of the sulphur than in the later portions.

My present invention is based on the foregoing discoveries and involves a two-stage treatment of the iron pyrites in the first stage of which a partial elimination of the sulphur is effected by the action of steam at elevated temperatures with the production of elemental sulphur and hydrogen sulfide, and in the second stage of which the residual iron sulfide remaining after such a partial elimination of sulphur is oxidized or roasted with the production of sulphur dioxide. The hydrogen sulfide and sulphur dioxide so produced are brought into reactive contact with one another thereby forming elemental sulphur.

In carrying out the invention, the iron pyrites, appropriately heated to the desired elevated temperature, say 600 to 700° C., is subjected to the action of steam and thereby a part of the sulphur content of the pyrites is converted into elemental sulphur and hydrogen sulfide. The residual iron sulfide resulting from this partial elimination of the sulphur of the iron pyrites is then treated with air or other oxidizing gas at an elevated temperature and thereby substantially all of the remaining sulphur is converted into sulphur dioxide.

These operations may advantageously be conducted in externally heated retorts, the iron pyrites being first subjected to the steam treatment, and then, without removal from the retort, to the oxidizing treatment. By providing several of such retorts in some of which the first stage treatment is progressing and in others the second stage treatment, the resulting gaseous products from all of the retorts may be conducted to a common condensing apparatus, where the hydrogen sulfide and sulphur dioxide will react and all of the elemental sulphur will be condensed. By properly controlling and synchronizing the operations of the several retorts, hydrogen sulfide and sulphur dioxide may be simultaneously and continuously produced in approximately the required relative proportions for substantial completion of the reaction therebetween.

Where a common condenser is connected to several retorts operating in the manner just described, the ultimate product recovered in the condenser will be elemental sulphur without contamination by excess of either hydrogen sulfide or sulphur dioxide. By such a procedure I obtain all the advantages of a rapid removal of substantially all of the suphur from the pyrites, and the ultimate recovery of this sulphur in elemental form.

In some cases it may be found desirable to conduct the gaseous products of the first stage treatment to a separate condenser where the elemental sulphur will be condensed and the hydrogen sulfide will pass out of the condenser with the exhaust gases. These exhaust gases may then be directly brought into reactive contact with the gaseous products from the second stage treatment of the residual iron sulfide. Or, the hydrogen sulfide in the exhaust gases may be appropriately stored and utilized as desired in the treatment of the gaseous products from the second stage treatment. These modifications may be particularly useful where the first and second stage treatment operations of the invention are not properly synchronized, or become temporarily out of step.

While the invention is of especial advantage in the treatment of iron pyrites, it is also applicable to the recovery of sulphur from other iron and other metal sulfides. Thus natural iron sulfides of the type of pyrrhotite, and zinc blende, and the like, may be employed in the practice of the invention. The invention is thus applicable to any metal sulfide whose sulphur content can be in whole or in part removed by reaction with steam at elevated temperatures. Throughout this specification and the appended claims, I have used iron pyrites as typical and representative of such metal sulfides, and with the intention of including and covering all such metal sulfides, as well as ores, concentrates or other products containing the same.

Various forms of apparatus are available for the practice of the invention. In the accompanying drawing I have diagrammatically illustrated an arrangement of apparatus that is satisfactory for the purpose. In general, this apparatus includes a plurality of rotatably mounted inclined cylindrical retorts 5. The retorts are externally heated and in the apparatus of the drawing an independent furnace structure 6 is associated with each retort. Any appropriate heating agency may be provided in conjunction with the furnace structures 6.

At its upper or charging end, each retort 5 extends into a stationary housing 7. A feeding hopper 8 is associated with each housing 7 and is adapted to feed the solid material, such as iron pyrites, into the retort 5. The lower or discharge end of each retort 5 extends into a stationary housing 9, with which is associated a residue discharge spout or chute 10. Appropriate sealing agencies are provided in conjunction with the housings 7 and 9 and their appurtenances.

Steam, air, or other appropriate gas may be introduced into each retort 5 through a valved supply pipe 11. The gaseous products of the reaction taking place in each retort 5 are withdrawn from the retort through a valved outlet pipe 12 communicating with a common condenser 13. The condenser is provided with a cooling coil 14, valved gas outlets 15 and a manhole 16.

For purpose of illustration, I have shown only four retorts in the apparatus of the accompanying drawing. It is to be understood, however, that in practice a larger number of retorts will ordinarily be employed thereby securing better control and uniformity of the desired synchronous operation of the several retorts.

The operation of the apparatus shown in the drawing will be generally understood from the foregoing description. Certain of the retorts will be treating fresh pyrites with steam for the removal of a part of the sulphur content of the pyrites and the formation of a gaseous product containing elemental sulphur and hydrogen sulfide. The remaining retorts will be treating the residual iron sulfide, resulting from the partial elimination of sulphur from the fresh iron pyrites, with air or other oxidizing gas in the course of which treatment substantially all of the remaining sulphur is converted into sulphur dioxide and withdrawn from the retorts in the gaseous products of the reaction. The gaseous products from the several retorts are conveyed to the common condenser 13 where elemental sulphur is deposited, in either a solid or liquid condition depending upon the temperature maintained within the condenser. From time to time, the accumulated sulphur is removed through the manhole 16, or other appropriate discharging means.

The operations in the several retorts 5 are appropriately controlled and synchronized so that the hydrogen sulfide and sulphur dioxide content of the mixing gases flowing into the common condenser 13 are relatively proportioned to complete the reaction therebetween in which elemental sulphur is formed.

Where the retorts 5 are inclined and rotated, the solid material progresses therethrough in a substantially continuous manner. Under such conditions of operation, it is preferable to carry out the first stage treatment of the invention in one or more retorts and to convey the residues discharging from such retorts, with the least possible loss of heat, to other retorts in which the second stage treatment of the invention is carried out. If desired, each retort may be operated in an intermittent manner, as in batch operation, in which case the solid material remains in the retort during both the first and second stage treatments of the invention.

I claim:

1. The method of recovering sulphur from iron pyrites which consists in effecting a partial elimination of the sulphur from iron pyrites by subjecting the pyrites to the action of steam at an elevated temperature and thereby forming a gaseous product containing elemental sulphur and hydrogen sulfide, effecting a further removal of sulphur from the residual iron sulfide remaining after such a partial elimination of sulphur from iron pyrites by subjecting the residual iron sulfide to oxidation at an elevated temperature and thereby forming a gaseous product containing sulphur dioxide, and subjecting the gaseous products resulting from the foregoing operations to a condensation operation in the course of which the hydrogen sulfide and sulphur dioxide react and form elemental sulphur and a large part of all the elemental sulphur present is condensed.

2. The method of recovering sulphur from iron pyrites which consists in effecting a partial elimination of the sulphur from iron pyrites by subjecting the pyrites to the action of steam at an elevated temperature and thereby forming a gaseous product containing elemental sulphur and hydrogen sulfide, effecting a further removal of sulphur from the residual iron sulfide remaining after such a partial elimination of sulphur from iron pyrites by subjecting the residual iron sulfide to oxidation at an elevated temperature and thereby forming a gaseous product containing sulphur dioxide, conducting the gaseous products resulting from the foregoing operations to a common condensing apparatus where the hydrogen sulfide and sulphur dioxide react and form elemental sulphur and a large part of all the elemental sulphur present is condensed, and so controlling the operations of forming said gaseous products that their respective contents of hydrogen sulfide and sulphur dioxide are relatively proportioned to effect substantial completion of the reaction therebetween.

3. The method of recovering sulphur from iron pyrites which consists in subjecting iron pyrites to the action of steam at an elevated temperature and thereby converting a part of the sulphur content of the pyrites into hydrogen sulphide, further roasting the residual iron sulphide resulting from a partial removal of sulphur from iron pyrites and thereby producing sulphur dioxide, causing the hydrogen sulphide and sulphur dioxide produced as aforesaid to react with the formation of elemental sulphur, condensing the resulting elemental sulphur and storing the residual unreacted on gas to be used later for reaction with an excess of the other evolved gas.

4. The method of recovering sulphur from iron pyrites which consists in subjecting iron pyrites to the action of steam at an elevated temperature in at least one of a group of synchronized retorts and thereby converting a part of the sulphur content of the pyrites into hydrogen sulphide, further roasting the residual iron sulphide resulting from a partial removal of sulphur from iron pyrites in a separate one of a group of synchronized retorts and thereby producing sulphur dioxide, and causing the hydrogen sulphide and sulphur dioxide from the synchronized processes produced as aforesaid to react in a common condenser with the formation and condensation of elemental sulphur.

5. The method of recovering sulphur from iron pyrites which consists in subjecting the iron pyrites to the action of steam at an elevated temperature in at least one of a group of retorts and thereby converting a part of the sulphur content of the pyrites into hydrogen sulphide, storing the resulting hydrogen sulphide, further roasting the residual iron sulphide resulting from a partial removal of sulphur from iron pyrites in a separate one of a group of retorts, and thereby producing sulphur dioxide, and causing the stored hydrogen sulphide and the sulphur dioxide from the process produced as aforesaid to react in a common condenser with the formation and condensation of elemental sulphur.

In testimony whereof I affix my signature.

RAYMOND F. BACON.